US008692868B2

(12) United States Patent
Chang

(10) Patent No.: US 8,692,868 B2
(45) Date of Patent: Apr. 8, 2014

(54) LETTERBOX MARGIN PROCESSING METHOD FOR IDENTIFYING LETTERBOX MARGINS OF TARGET FRAME ACCORDING TO FRAME PACKING TYPE CORRESPONDING TO 3D VIDEO INPUT AND RELATED LETTERBOX MARGIN PROCESSING APPARATUS THEREOF

(75) Inventor: Yung-Chang Chang, New Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 424 days.

(21) Appl. No.: 13/080,683

(22) Filed: Apr. 6, 2011

(65) Prior Publication Data
US 2012/0075417 A1    Mar. 29, 2012

Related U.S. Application Data

(60) Provisional application No. 61/387,241, filed on Sep. 28, 2010.

(51) Int. Cl.
*H04N 13/00* (2006.01)

(52) U.S. Cl.
USPC ............................................. 348/43

(58) Field of Classification Search
USPC ...................................... 348/43, 51
See application file for complete search history.

(56) References Cited

U.S. PATENT DOCUMENTS

2005/0094033 A1* 5/2005 Schoner et al. ............... 348/558
2012/0020413 A1* 1/2012 Chen et al. ................ 375/240.26

FOREIGN PATENT DOCUMENTS

| CN | 1835601 A | 9/2006 |
|----|-----------|--------|
| CN | 101198074 A | 6/2008 |
| CN | 101626465 A | 1/2010 |
| CN | 101668221 A | 3/2010 |

\* cited by examiner

*Primary Examiner* — Sath V Perungavoor
*Assistant Examiner* — Jeffery Williams
(74) *Attorney, Agent, or Firm* — Scott Margo; Winston Hsu

(57) ABSTRACT

A letterbox margin processing method includes: receiving a three-dimensional (3D) video input; determining a frame packing type corresponding to the 3D video input; selecting a first image region from a target frame according to the determined frame packing type, wherein the target frame is derived from the 3D video input; and detecting letterbox margins within the first image region.

31 Claims, 14 Drawing Sheets

LETTERBOX MARGIN PROCESSING METHOD FOR IDENTIFYING LETTERBOX MARGINS OF TARGET FRAME ACCORDING TO FRAME PACKING TYPE CORRESPONDING TO 3D VIDEO INPUT AND RELATED LETTERBOX MARGIN PROCESSING APPARATUS THEREOF

CROSS REFERENCE TO RELATED APPLICATIONS

This application claims the benefit of U.S. provisional application No. 61/387,241, filed on Sep. 28, 2010 and incorporated herein by reference.

BACKGROUND

The disclosed embodiments of the present invention relate to detecting letterbox margins of a frame, and more particularly, to a letterbox margin processing method for identifying letterbox margins within a target frame according to a frame packing type corresponding to a three-dimensional (3D) video input and related letterbox margin processing apparatus thereof.

Letterboxing is a practice of transferring a conventional two-dimensional (2D) movie originally filed in one aspect ratio (e.g., 21:9 or 4:3) to video frames each having another aspect ratio (e.g., 16:9 or 1.85:1) while preserving the movie's original aspect ratio. The resultant video frame therefore has letterbox margins (e.g., black bars) disposed above and below the video content with the preserved aspect ratio, or has letterbox margins (e.g., black bars) placed on a left side and a right side of the video content with the preserved aspect ratio. The letterboxed video frames of the filmed movie may be stored on an optical storage medium, such as a digital versatile disc (DVD) or a Blu-ray disc (BD). When the user loads the optical storage medium into an optical storage apparatus (e.g., an optical disc player), the letterboxed video frames may be displayed on a display apparatus to thereby allow the user to view the video content presented in the movie's original aspect ratio. However, the user may want to view the video content of the filmed movie on the display apparatus without the letterbox margins. Thus, conventional letterbox detection is performed to detect the letterbox margins in each letterboxed video frame, and then remove them from the letterboxed video frame to generate a margin-removed video frame. Next, the margin-removed video frame is scaled to a full screen/full resolution of the display apparatus when displayed.

Recently, three-dimensional (3D) video contents are becoming more and more popular. However, the storage/transmission of the 3D video content may be different from that of the 2D video content. Thus, the conventional letterbox detection applicable to letterboxed frames of a 2D video input may not be suitable for letterboxed frames of a 3D video input, and performing the conventional letterbox detection upon the 3D video input may fail to correctly detect and remove the letterbox margins presented in each video frame of the 3D video input.

SUMMARY

In accordance with exemplary embodiments of the present invention, a letterbox margin processing method for identifying letterbox margins within a target frame according to a frame packing type corresponding to a three-dimensional (3D) video input and related letterbox margin processing apparatus thereof are proposed to solve the above-mentioned problem.

According to a first aspect of the present invention, an exemplary letterbox margin processing method is disclosed. The exemplary letterbox margin processing method includes: receiving a three-dimensional (3D) video input; determining a frame packing type corresponding to the 3D video input; selecting a first image region from a target frame according to the determined frame packing type, wherein the target frame is derived from the 3D video input; and detecting letterbox margins within the first image region.

According to a second aspect of the present invention, an exemplary letterbox margin processing method is disclosed. The exemplary letterbox margin processing method includes: receiving a three-dimensional (3D) video input; detecting a first letterbox margin and a second letterbox margin within a target frame derived from the 3D video input; determining a frame packing type corresponding to the 3D video input; determining a third letterbox margin of a first image region within the target frame according to the determined frame packing type and the detected second letterbox margin, wherein the determined third letterbox margin and the first letterbox margin are letterbox margins of the first image region; and determining a fourth letterbox margin of a second image region within the target frame according to the determined frame packing type and the detected first letterbox margin, wherein the determined fourth letterbox margin and the detected second letterbox margin are letterbox margins of the second image region.

According to a third aspect of the present invention, an exemplary letterbox margin processing method is disclosed. The exemplary letterbox margin processing method includes: receiving a three-dimensional (3D) video input; detecting a first letterbox margin and a second letterbox margin within a target frame derived from the 3D video input; determining a frame packing type corresponding to the 3D video input; removing letterbox margins of a first image region within the target frame according to the determined frame packing type, the detected first letterbox margin, and the detected second letterbox margin, wherein the letterbox margins of the first image region include the detected first letterbox margin; and removing letterbox margins of a second image region within the target frame according to the determined frame packing type, the detected first letterbox margin, and the detected second letterbox margin, wherein the letterbox margins of the second image region include the detected second letterbox margin.

According to a fourth aspect of the present invention, an exemplary letterbox margin processing apparatus is disclosed. The exemplary letterbox margin processing apparatus includes a processing circuit and a letterbox margin detecting circuit. The processing circuit is arranged to receive a three-dimensional (3D) video input, and determine a frame packing type corresponding to the 3D video input. The letterbox margin detecting circuit is coupled to the processing circuit, and utilized for selecting a first image region from a target frame according to the determined frame packing type, and detecting letterbox margins within the first image region, wherein the target frame is derived from the 3D video input.

According to a fifth aspect of the present invention, an exemplary letterbox margin processing apparatus is disclosed. The exemplary letterbox margin processing apparatus includes a processing circuit, a first letterbox margin detecting circuit, and a second letterbox margin detecting circuit. The processing circuit is arranged to receive a three-dimensional (3D) video input and determine a frame packing type corresponding to the 3D video input. The first letterbox margin detecting circuit is coupled to the processing circuit, and utilized for detecting a first letterbox margin and a second letterbox margin within a target frame derived from the 3D video input. The second letterbox margin detecting circuit is coupled to the processing circuit and the first letterbox margin detecting circuit, and utilized for determining a third letterbox margin of a first image region within the target frame according to the determined frame packing type and the detected second letterbox margin, and determining a fourth letterbox margin of a second image region within the target frame according to the determined frame packing type and the detected first letterbox margin, wherein the determined third letterbox margin and the first letterbox margin are letterbox margins of the first image region, and the determined fourth letterbox margin and the detected second letterbox margin are letterbox margins of the second image region.

According to a sixth aspect of the present invention, an exemplary letterbox margin processing apparatus is disclosed. The exemplary letterbox margin processing apparatus includes a processing circuit, a letterbox margin detecting circuit, and a letterbox margin removing circuit. The processing circuit is arranged to receive a three-dimensional (3D) video input and determine a frame packing type corresponding to the 3D video input. The letterbox margin detecting circuit is coupled to the processing circuit, and utilized for detecting a first letterbox margin and a second letterbox margin within a target frame derived from the 3D video input. The letterbox margin removing circuit is coupled to the processing circuit and the letterbox margin detecting circuit, and utilized for removing letterbox margins of a first image region within the target frame according to the determined frame packing type, the detected first letterbox margin, and the detected second letterbox margin, and removing letterbox margins of a second image region within the target frame according to the determined frame packing type, the detected first letterbox margin, and the detected second letterbox margin, wherein the letterbox margins of the first image region include the detected first letterbox margin, and the letterbox margins of the second image region include the detected second letterbox margin.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
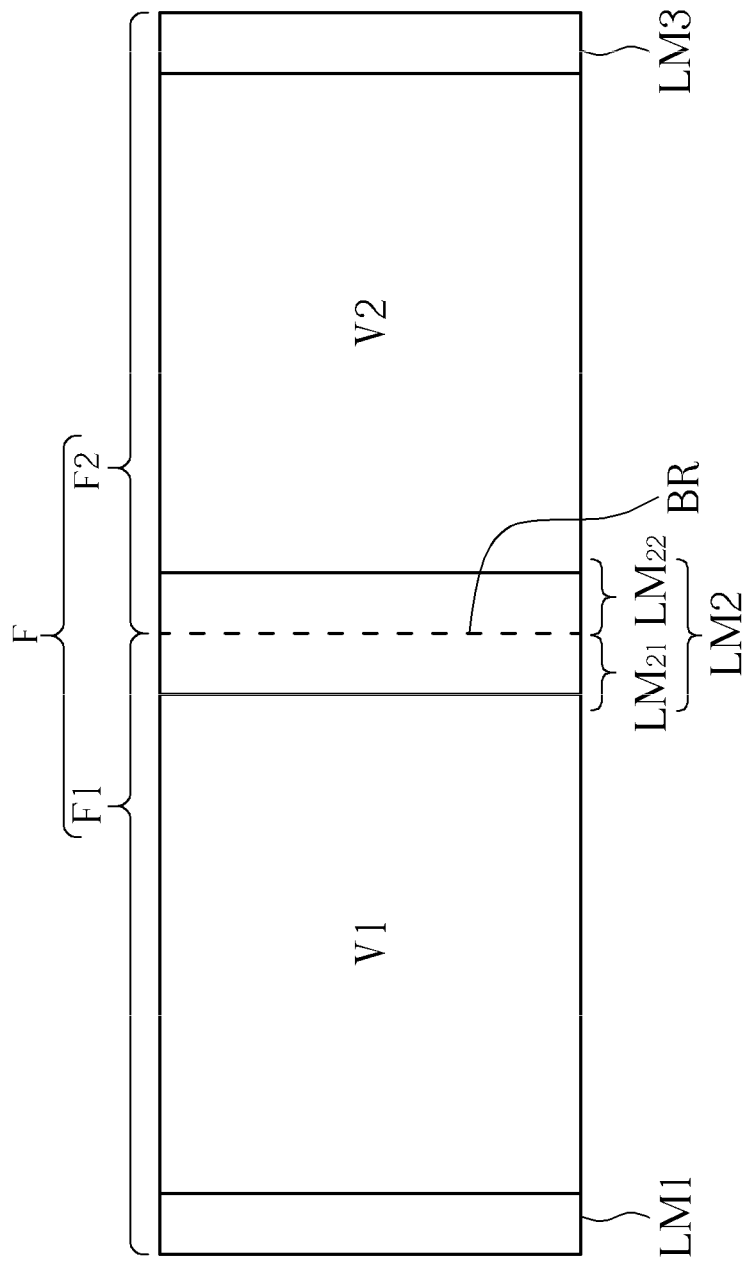
FIG. 1 is a diagram illustrating a first frame packing type of an exemplary frame derived from the 3D video input to be processed by the present invention.

The conception of the present invention is to detect the letterbox margins of each frame derived from a 3D video input by referring to a frame packing type corresponding to the 3D video input. For example, within one frame derived from the 3D video input, a left-view frame and a right-view frame for 3D video playback may be stored/transmitted in a side-by-side arrangement or a top-and-bottom arrangement. FIG. 1 is a diagram illustrating a first frame packing type of an exemplary frame derived from the 3D video input to be processed by the present invention. The frame F derived from the 3D video input has frames F1 and F2 of different views arranged horizontally. For example, one of the frames F1 and F2 is a left-view frame, and the other of the frames F1 and F2 is a right-view frame. As shown in FIG. 1, the frame F has video content areas V1, V2 and non-video content areas LM1, LM2, LM3, wherein a first half $LM_{21}$ of the non-video content area LM2 belongs to the frame F1, and a second half $LM_{22}$ of the non-video content area LM2 belongs to the frame F2. More specifically, LM1 and $LM_{21}$ are letterbox margins (e.g., black bars) of the frame F1, and $LM_{22}$ and LM3 are letterbox margins (e.g., black bars) of the frame F2. When the frame packing type of the frame F is determined successfully, the determined frame packing type would indicate that the frames F1 and F2 have a side-by-side arrangement. Therefore, the boundary BR between the horizontally-arranged frames F1 and F2 can be easily known to facilitate the detection of the letterbox margins of each frame F1/F2.

Figure 2:
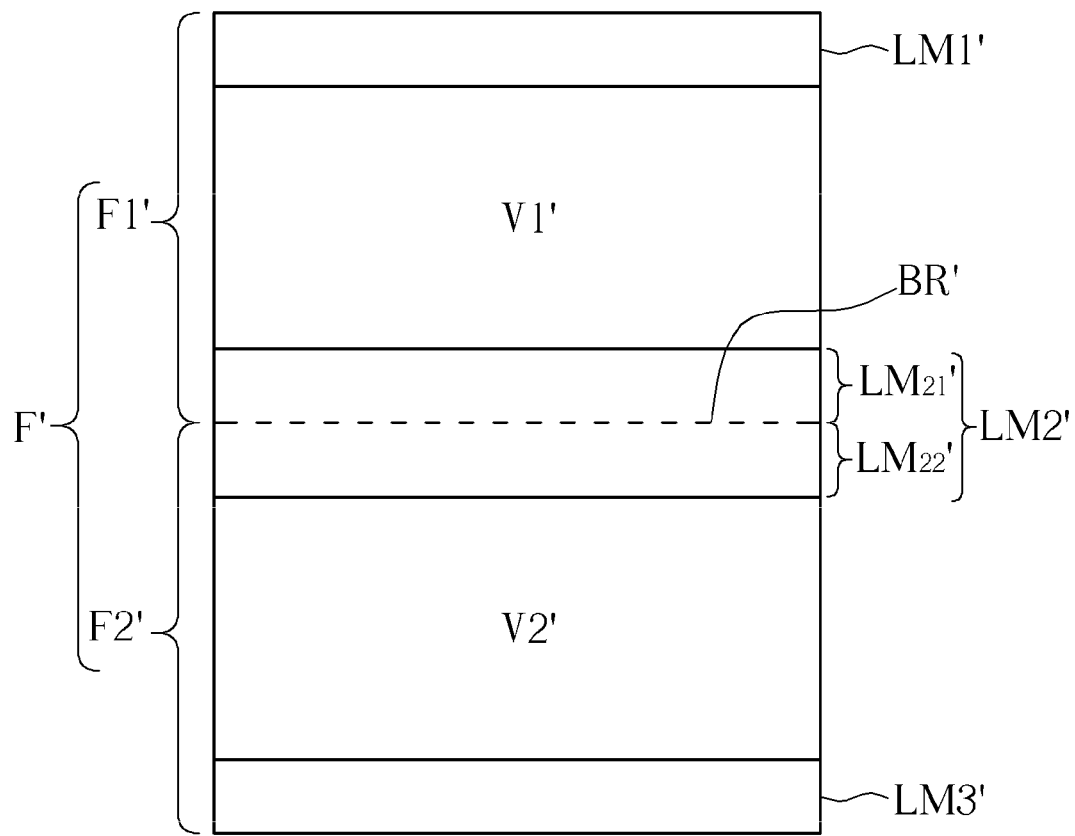
FIG. 2 is a diagram illustrating a second frame packing type of an exemplary frame derived from the 3D video input to be processed by the present invention.

Please refer to FIG. 2, which is a diagram illustrating a second frame packing type of an exemplary frame derived from the 3D video input to be processed by the present invention. The frame F' derived from the 3D video input has frames F1' and F2' of different views arranged vertically. For example, one of the frames F1' and F2' is a left-view frame, and the other of the frames F1' and F2' is a right-view frame. As shown in FIG. 2, the frame F' has video content areas V1', V2' and non-video content areas LM1', LM2', LM3', wherein a first half $LM_{21}'$ of the non-video content area LM2' belongs to the frame F1', and a second half $LM_{22}'$ of the non-video content area LM2' belongs to the frame F2'. More specifically, LM1' and $LM_{21}'$ are letterbox margins (e.g., black bars) of the frame F1', and $LM_{22}'$ and LM3' are letterbox margins (e.g., black bars) of the frame F2'. When the frame packing type of the frame F' is determined successfully, the determined frame packing type would indicate that the frames F1' and F2' have a top-and-bottom arrangement. Therefore, the boundary BR' between the vertically-arranged frames F1' and F2' can be easily known to facilitate the detection of the letterbox margins of each frame F1'/F2'.

The identified non-video content areas LM1-LM3/LM1'-LM3' may be removed from the frame F/F', and the remaining video content area V1/V2 (or V1'/V2') of each frame F1/F2 (or F1'/F2') may be scaled to a full screen/full resolution of on a display apparatus when displayed. In this way, the frames viewed by user's left-view and right-view have no letterbox margins, and the user therefore can have desired 3D viewing experience without disturbance of the letterbox margins.

Further details of technical features of the present invention are described as follows. Please refer to FIG. 3, which is a flowchart illustrating a first exemplary letterbox margin processing method according to an embodiment of the present invention. Provided that the result is substantially the same, the steps are not required to be executed in the exact order shown in FIG. 3. The exemplary letterbox margin processing method may be briefly summarized by following steps.

Step 300: Start.
Step 302: Receive a three-dimensional (3D) video input.
Step 304: Determine a frame packing type corresponding to the 3D video input.
Step 306: Select a first image region from a target frame according to the determined frame packing type, wherein the target frame is derived from the 3D video input.
Step 308: Detect letterbox margins within the first image region.
Step 310: Determine letterbox margins within a second image region of the target frame according to the detected letterbox margins within the first image region.
Step 312: Remove letterbox margins from the first image region and the second image region, and then scale remaining portions of the first image region and the second image region.
Step 314: End.

When the flow starts, a 3D video input is received for following video processing (steps 300 and 302). Next, step 304 is performed to identify a frame packing type corresponding to the 3D video input. Consider a first case where the 3D video input is a 3D video bitstream which transmits encoded frames. The frame packing type may be determined by parsing the 3D video bitstream. For example, the 3D video bitstream may include encoded frames complying with an H.264 standard. In accordance with the H.264 standard, supplemental enhancement information (SEI) may be used to transmit the frame packing type. An SEI message frame_packing_arrangement_type is defined to store a value indicative of the frame packing type. For instance, when the left-view frame and the right-view frame are horizontally combined in one decoded frame, the SEI message frame_packing_arrangement_type would store a value equal to 3 for indicating a side-by-side arrangement. When the left-view frame and the right-view frame are vertically combined in one decoded frame, the SEI message frame_packing_arrangement_type would store a value equal to 4 for indicating a top-and-bottom arrangement.

Alternatively, the 3D video bitstream may include encoded frames complying with an audio and video coding standard (AVS). In accordance with the AVS standard, a syntax element stereo_packing_mode may be used to indicate the frame packing type. For instance, when the left-view frame and the right-view frame are horizontally combined in one decoded frame, the syntax element stereo_packing_mode would store binary bits "01" for indicating a side-by-side arrangement. When the left-view frame and the right-view frame are vertically combined in one decoded frame, the syntax element stereo_packing_mode would store binary bits "10" for indicating a top-and-bottom arrangement.

Alternatively, the 3D video bitstream may include encoded frames complying with an advanced streaming format (ASF) based standard, such as a Windows Media Video (WMV) format. In accordance with the ASF based standard, an extended content description object may be used to indicate the frame packing type. For instance, when the left-view frame and the right-view frame are horizontally combined in one decoded frame, one attribute Stereoscopic would record a boolean value "True", and another attribute StereopicLayout may record a unicode string "SideBySideRF (side-by-side, right image first)" or "SideBySideLF (side-by-side, left image first)". When the left-view frame and the right-view frame are vertically combined in one decoded frame, one attribute Stereoscopic would record a boolean value "True", and another attribute StereopicLayout may record a unicode string "OverUnderRT (over/under, right image top)" or "OverUnderLT (over/under, left image top)".

Please note that the encoded frames transmitted via the 3D video bitstream may be decoded into corresponding decoded frames. Thus, in an alternative design, the frame packing type may be determined according to a frame size of each decoded frame. For example, when it is detected that the frame size is large, the width and the height may be checked to identify the frame packing type. For instance, when the left-view frame and the right-view frame are horizontally combined in one decoded frame, the width of the decoded frame may be twice as large as the normal frame width (e.g., 1920). Besides, when the left-view frame and the right-view frame are vertically combined in one decoded frame, the height of the decoded frame may be twice as large as the normal frame height (e.g., 1080).

Consider a second case where the 3D video input, carrying decoded frames, is transmitted via a transmission interface. The frame packing type may be determined by a system indication specified by the transmission interface. For example, the transmission interface may be a high-definition multimedia interface (HDMI). An HDMI Vendor Specific InfoFrame with a 3D_Structure field may be sent, wherein the 3D_Structure field is used to indicate the frame packing type. For instance, when the left-view frame and the right-view frame are horizontally combined in one decoded frame, the 3D_Structure field may have binary bits "1000". When the left-view frame and the right-view frame are vertically combined in one decoded frame, the 3D_Structure field may have binary bits "0110".

Alternatively, the transmission interface may be a DisplayPort interface. In accordance with the DisplayPort specification, a payload may transmit a stereo interface method code to indicate the frame packing type. For instance, when the left-view frame and the right-view frame are horizontally combined in one decoded frame, the stereo interface method code may record a value equal to 4. When the left-view frame and the right-view frame are vertically combined in one decoded frame, the stereo interface method code may record a value equal to 2.

Moreover, as decoded frames are transmitted via the transmission interface (e.g., an HDMI interface or a DisplayPort interface), the frame packing type may be determined according to a frame size of each decoded frame. Specifically, when it is detected that the frame size is large, the width and the height may be checked to determine the frame packing type. For instance, when the left-view frame and the right-view frame are horizontally combined in one decoded frame, the width of the decoded frame may be twice as large as the normal frame width (e.g., 1920). When the left-view frame and the right-view frame are vertically combined in one decoded frame, the height of the decoded frame may be twice as large as the normal frame height (e.g., 1080).

After the frame packing type is identified, the boundary between the left-view frame and the right-view frame horizontally/vertically combined within a target frame (e.g., a decoded frame) derived from the received 3D video input would be known. Step 306 is performed to select a first image region from the target frame according to the determined frame packing type. Taking the frame F shown in FIG. 1 for example, the boundary BR is determined when the determined frame packing type indicates that the frames F1 and F2 are horizontally arranged within the frame F. Thus, step 306 selects an image region corresponding to one of the frames F1 and F2 as the first image region. Taking the frame F' shown in FIG. 2 for example, the boundary BR' is determined when the determined frame packing type indicates that the frames F1' and F2' are vertically arranged within the frame F'. Thus, step 306 selects an image region corresponding to one of the frames F1' and F2' as the first image region.

Next, step 308 is performed to detect letterbox margins within the first image region. By way of example, but not limitation, the conventional letterbox detection applicable to frames of a 2D video input may be employed to find the letterbox margins (e.g., black bars) within the first image region. When the image region corresponding to the frame F1 shown in FIG. 1 is selected as the first image region in step 306, step 308 would identify the non-video content areas $LM_1$ and $LM_{21}$ as letterbox margins by means of letterbox detection. When the image region corresponding to the frame F2 shown in FIG. 1 is selected as the first image region in step 306, step 308 would identify the non-video content areas $LM_3$ and $LM_{22}$ as letterbox margins by means of letterbox detection. Similarly, when the image region corresponding to the frame F1' shown in FIG. 2 is selected as the first image region in step 306, step 308 would identify the non-video content areas $LM_1'$ and $LM_{21}'$ as letterbox margins by means of letterbox detection. When the image region corresponding to the frame F2' shown in FIG. 2 is selected as the first image region in step 306, step 308 would identify the non-video content areas $LM_3'$ and $LM_{22}'$ as letterbox margins by means of letterbox detection.

In general, the left-view frame and the right-view frame packed/combined in the same frame have the same letterbox margin distribution characteristics. That is, the location and the size of the left non-video content area LM1 belonging to the frame F1 are identical to that of the left non-video content area $LM_{22}$ belonging to the frame F2; the location and the size of the right non-video content area $LM_{21}$ belonging to the frame F1 are identical to that of the right non-video content area LM3 belonging to the frame F2; the location and the size of the top non-video content area LM1' belonging to the frame F1' are identical to that of the top non-video content area $LM_{22}'$ belonging to the frame F2'; and the location and the size of the bottom non-video content area $LM_{21}'$ belonging to the frame F1' are identical to that of the bottom non-video content area LM3' belonging to the frame F2'. Based on such an observation, the letterbox margins within a second image region of the target frame may be directly determined by referring to the detected letterbox margins within the first image region without performing any letterbox detection upon the second image region. In other words, the location and the size of letterbox margins within the second image region (e.g., an image region corresponding to a non-selected left-view/right-view frame within the target frame) can be directly identified according to the location and the size of detected letterbox margins within the first image region (e.g., an image region corresponding to the selected left-view/right-view frame within the target frame). More specifically, step 310 would identify the non-video content areas $LM_3$ and $LM_{22}$ as letterbox margins when the non-video content areas $LM_1$ and $LM_{21}$ are found in step 308; step 310 would identify the non-video content areas $LM_1$ and $LM_{21}$ as letterbox margins when the non-video content areas $LM_3$ and $LM_{22}$ are found in step 308; step 310 would identify the non-video content areas $LM_3'$ and $LM_{22}'$ as letterbox margins when the non-video content areas $LM_1'$ and $LM_{21}'$ are found in step 308; and step 310 would identify the non-video content areas $LM_1'$ and $LM_{21}'$ as letterbox margins when the non-video content areas $LM_3'$ and $LM_{22}'$ are found in step 308.

In this exemplary embodiment, the letterbox margins identified by steps 308 and 310 may be removed to obtain margin-removed left-view and right-view frames (i.e., frames respectively including the video content areas V1 and V2 or frames respectively including the video content areas V1' and V2'), and then each of the margin-removed frames is scaled to a full screen/full resolution of a display apparatus to thereby allow the user to view the 3D video content having no letterbox margins (step 312). However, this is for illustrative purposes only, and is not meant to be a limitation of the present invention. Any video post-processing operation which is based on the identified letterbox margins is feasible. For example, the letterboxed frames F1 and F2 (or F1' and F2') may be displayed with caption and/or supplemental information shown in identified letterbox margin(s) without affecting the actual playback of the desired video content areas V1 and V2 (or V1' and V2').

Figure 3:
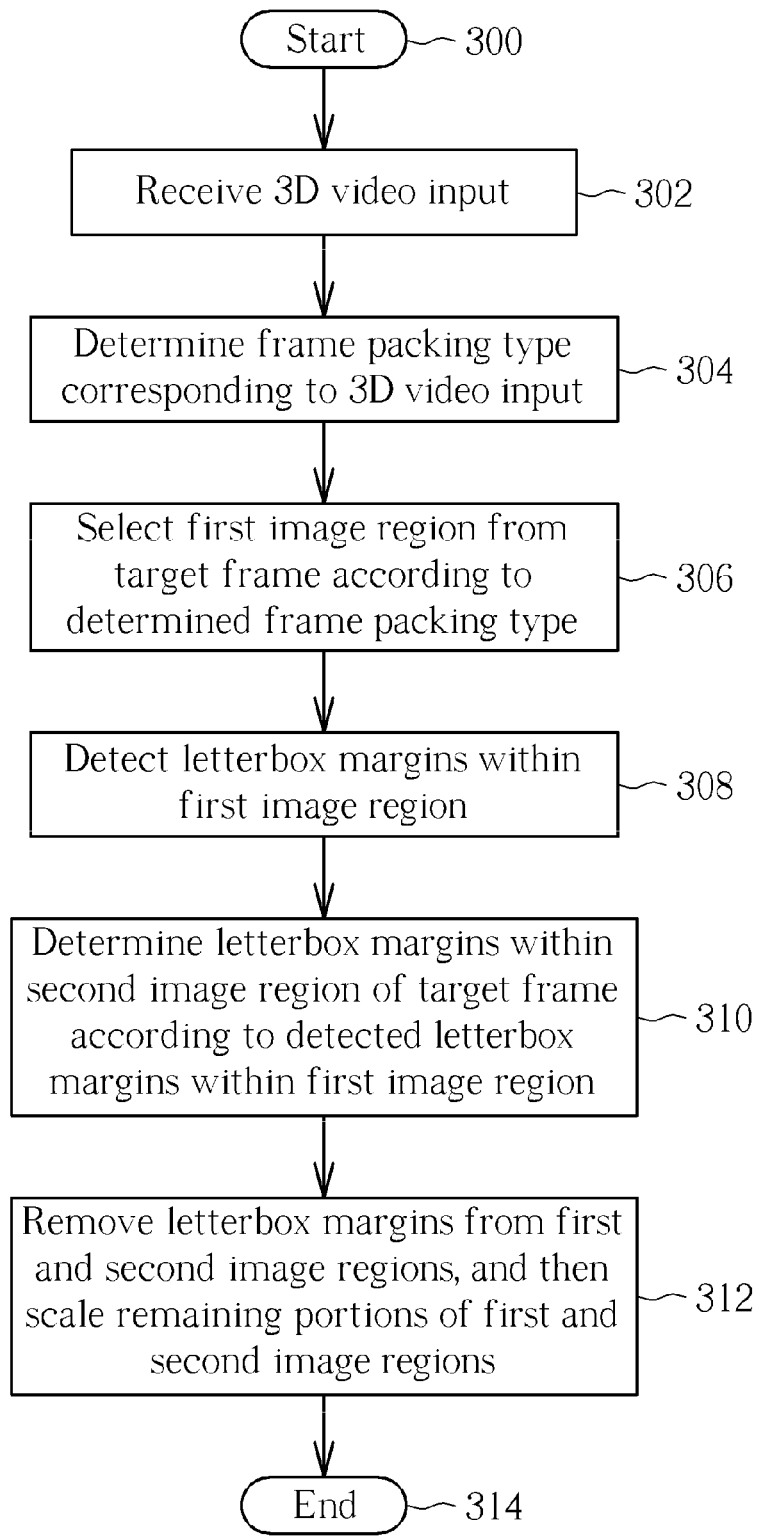
FIG. 3 is a flowchart illustrating a first exemplary letterbox margin processing method according to an embodiment of the present invention.
Figure 4:
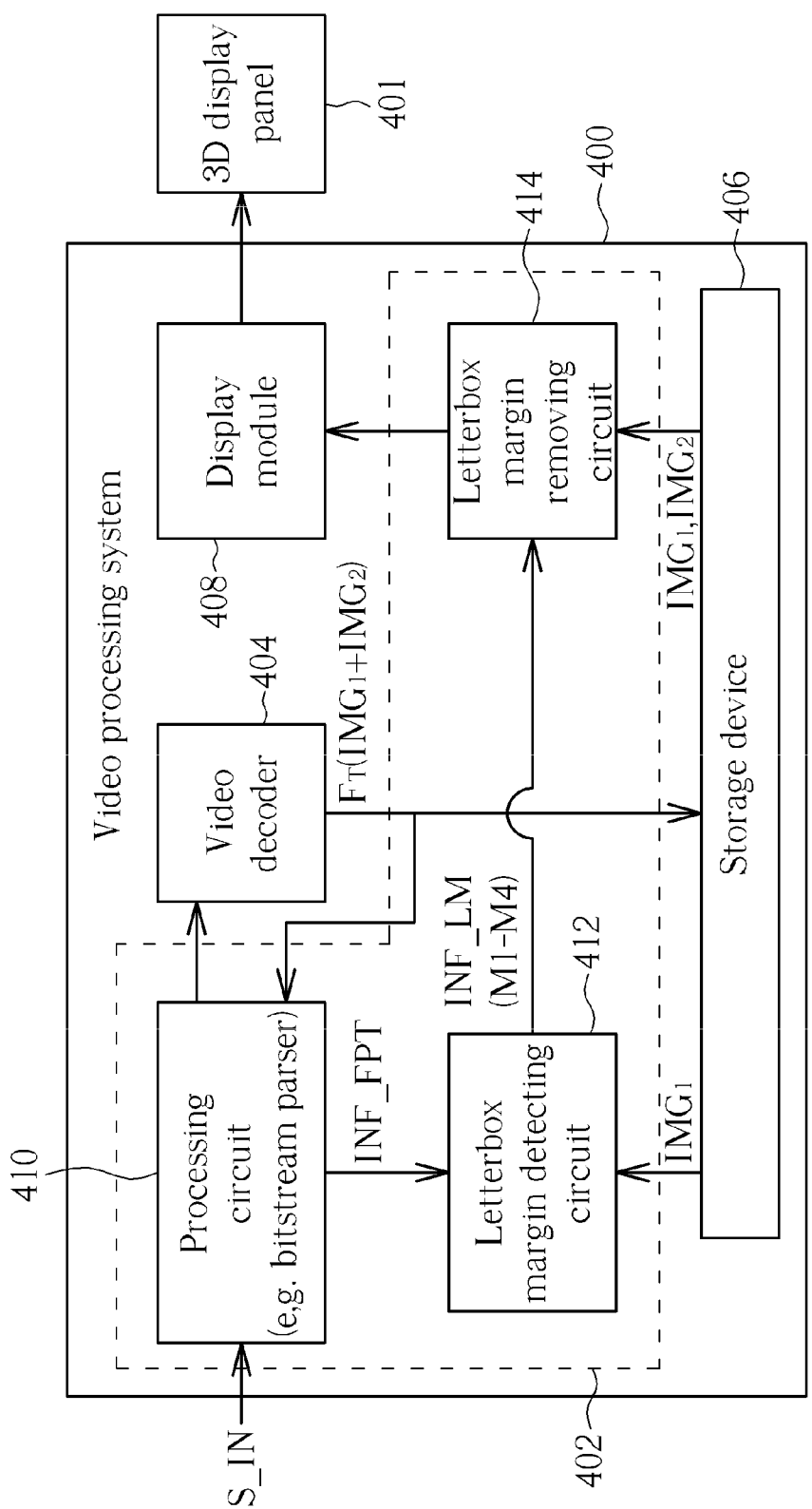
FIG. 4 is a diagram illustrating a video processing system according to a first exemplary embodiment of the present invention.

Please refer to FIG. 4, which is a diagram illustrating a video processing system according to a first exemplary embodiment of the present invention. The exemplary video processing system 400 includes, but is not limited to, a letterbox margin processing apparatus 402, a video decoder 404, a storage device (e.g., a memory device) 406, and a display module 408. The letterbox margin processing apparatus 402 includes, but is not limited to, a processing circuit (e.g., a bitstream parser) 410, a letterbox margin detecting circuit 412, and a letterbox margin removing circuit 414. The exemplary letterbox margin processing method shown in FIG. 3 may be employed by the letterbox margin processing apparatus 402. The processing circuit 410 receives a 3D video input (e.g., a 3D video bitstream which transmits encoded frames) S_IN, and determines a frame packing type INF_FPT by parsing the 3D video input S_IN or checking the frame size of each decoded frame generated by the video decoder 404. By way of example, but not limitation, the 3D video input S_IN may comply with the H.264 standard, the AVS standard, or the ASF based standard. Regarding the video decoder 404, it decodes each encoded frame transmitted by the 3D video input S_IN, and accordingly generates a corresponding decoded frame to the storage device 406. For example, a target frame $F_T$ (e.g., the frame F shown in FIG. 1 or the frame F' shown in FIG. 2) is generated from the video decoder 404 and stored into the storage device 406.

The letterbox margin detecting circuit 412 selects a first image region $IMG_1$ from the target frame $F_T$ according to the determined frame packing type INF_FPT. For example, the first image region $IMG_1$ may be an image region corresponding to one of the frames F1 and F2 shown in FIG. 1 when the frame packing type INF_FPT indicates a side-by-side arrangement; alternatively, the first image region $IMG_1$ may be an image region corresponding to one of the frames F1' and F2' shown in FIG. 2 when the frame packing type INF_FPT indicates a top-and-bottom arrangement. Next, the letterbox margin detecting circuit 412 detects letterbox margins M1 and M2 within the first image region $IMG_1$, and then directly determines letterbox margins M3 and M4 within a second image region $IMG_2$ of the target frame $F_T$ according to the detected letterbox margins M1 and M2. For example, the letterbox margins M1-M4 may include LM1, $LM_{21}$, $LM_{22}$, and LM3 shown in FIG. 1 when the frame packing type INF_FPT indicates a side-by-side arrangement; alternatively, the letterbox margins M1-M4 may include LM1', $LM_{21}'$, $LM_{22}'$, and LM3' shown in FIG. 2 when the frame packing type INF_FPT indicates a top-and-bottom arrangement. After receiving the letterbox margin information INF_LM indicative of the positions of the letterbox margins M1-M4, the letterbox margin removing circuit 414 removes letterbox margins M1-M4 from the first image region $IMG_1$ and the second image region $IMG_2$, and then scales remaining portions of the first image region $IMG_1$ and the second image region $IMG_2$. Next, the display module 408 drives the 3D display panel 401 according to outputs of the letterbox margin removing circuit 414.

As a person skilled in the art should readily understand operations of the circuit components shown in FIG. 4 after reading above paragraphs directed to the steps shown in FIG. 3, further description is omitted here for brevity.

Figure 5:
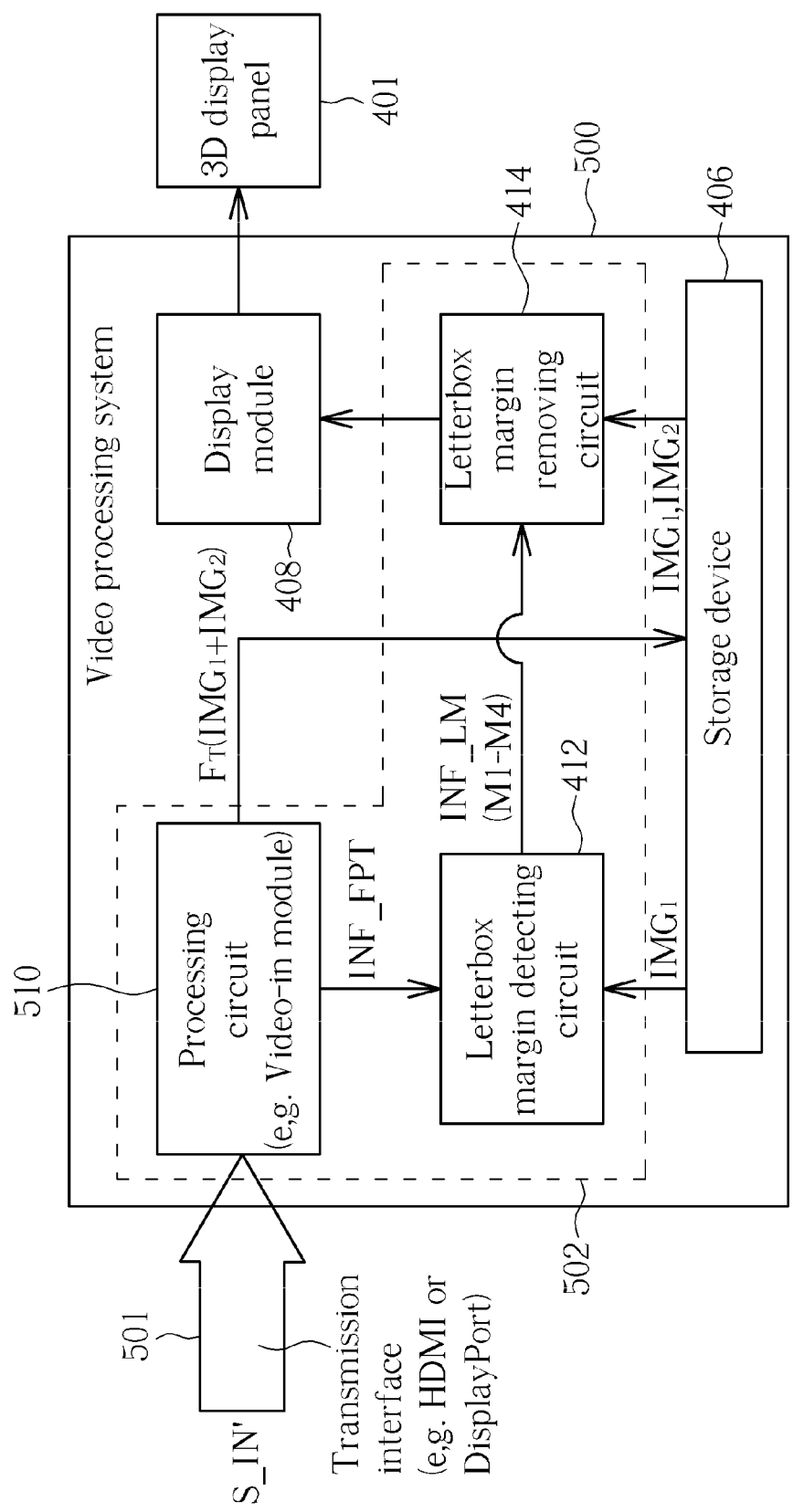
FIG. 5 is a diagram illustrating a video processing system according to a second exemplary embodiment of the present invention.

Please refer to FIG. 5, which is a diagram illustrating a video processing system according to a second exemplary embodiment of the present invention. The exemplary video processing system 500 includes, but is not limited to, a letterbox margin processing apparatus 502, and the aforementioned storage device 406 and display module 408. The letterbox margin processing apparatus 502 includes, but is not limited to, a processing circuit (e.g., a video-in module) 510 and the aforementioned letterbox margin detecting circuit 412 and letterbox margin removing circuit 414. The exemplary letterbox margin processing method shown in FIG. 3 may be employed by the letterbox margin processing apparatus 502. The major difference between the letterbox margin processing apparatuses 502 and 402 is the processing circuit 510 which may determine the frame packing type INF_FPT by receiving a system indication (e.g., an HDMI 3D_Structure field or a DisplayPort stereo interface method code) specified by the transmission interface (e.g., an HDMI interface or a DisplayPort interface) 501 or checking the frame size of each decoded frame transmitted by the 3D video input S_IN'. For example, the 3D video input S_IN' may carry decoded frames generated by a preceding stage (e.g., a video decoder implemented in an optical disc player).

As a person skilled in the art should readily understand operations of the circuit components shown in FIG. 5 after reading above paragraphs directed to steps in FIG. 3 and certain circuit components in FIG. 4, further description is omitted here for brevity.

Figure 6:
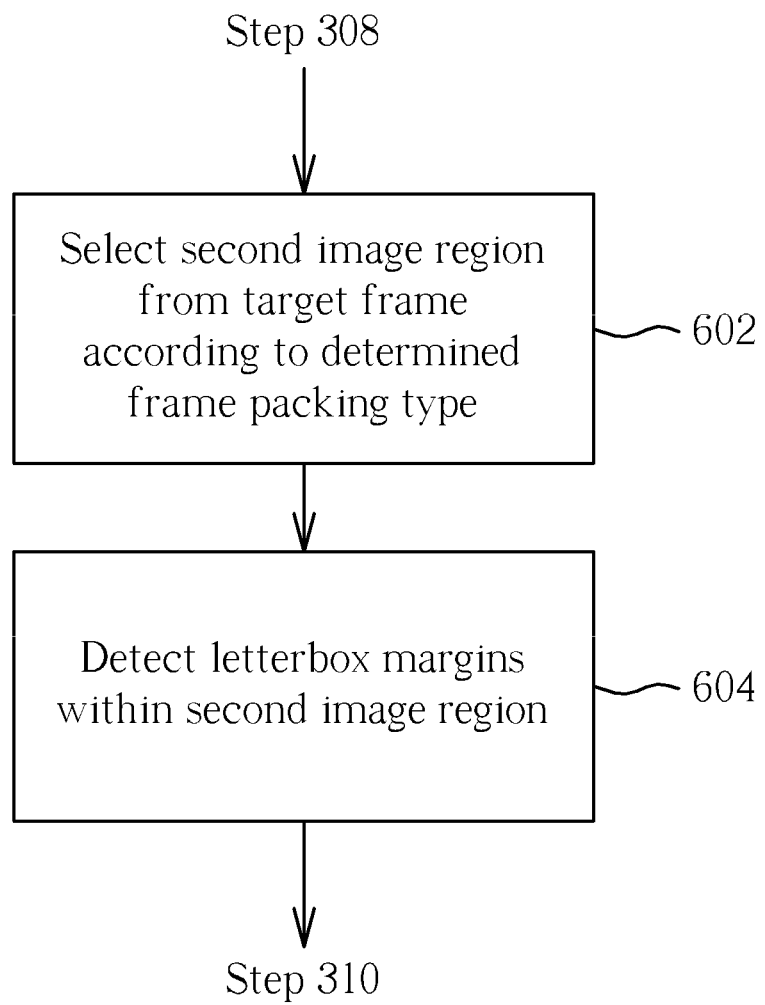
FIG. 6 is a diagram illustrating an alternative design of the step 310 shown in FIG. 3.

As mentioned above, due to the fact that the left-view frame and the right-view frame packed/combined in the same frame have the same letterbox margin distribution characteristics, step 310 therefore directly identifies the letterbox margins within a second image region of the target frame by referring to the detected letterbox margins within the first image region without performing any letterbox detection upon the second image region. However, this is for illustrative purposes only, and is not meant to be a limitation of the present invention. In an alternative design, the letterbox detection may be applied to the second image region. Please refer to FIG. 6, which is a diagram illustrating an alternative design of the step 310 shown in FIG. 3. The step 310 shown in FIG. 3 may be replaced by a combination of steps 602 and 604 shown in FIG. 6. More specifically, step 602 is performed to select the second image region from the target frame according to the determined frame packing type, and step 604 is performed to detect letterbox margins within the second image region, for example, by using the conventional letterbox detection applicable to frames of a 2D video input. The same objective of identifying the letterbox margins within the second image region is achieved.

Figure 7:
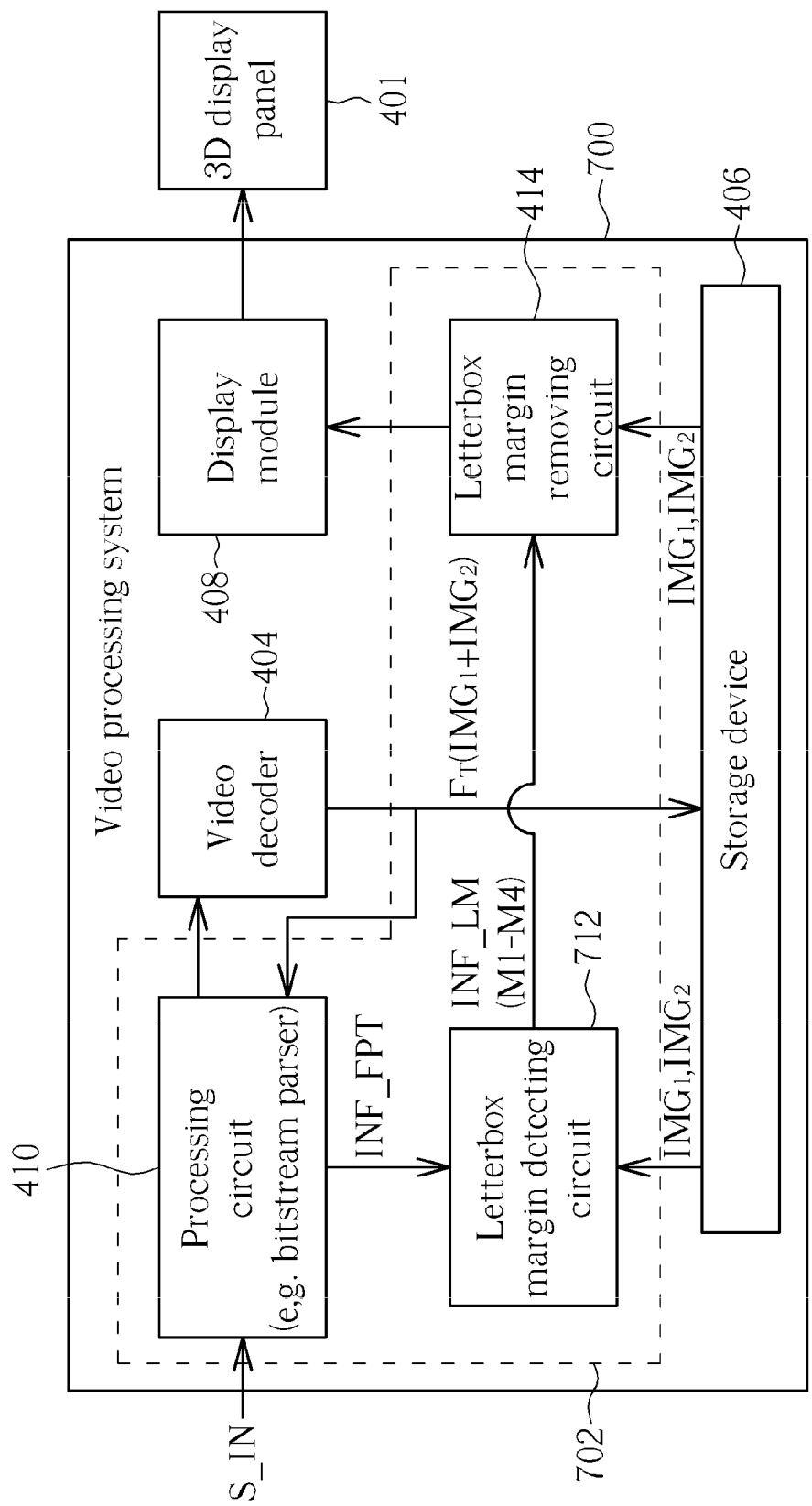
FIG. 7 is a diagram illustrating a video processing system according to a third exemplary embodiment of the present invention.
Figure 8:
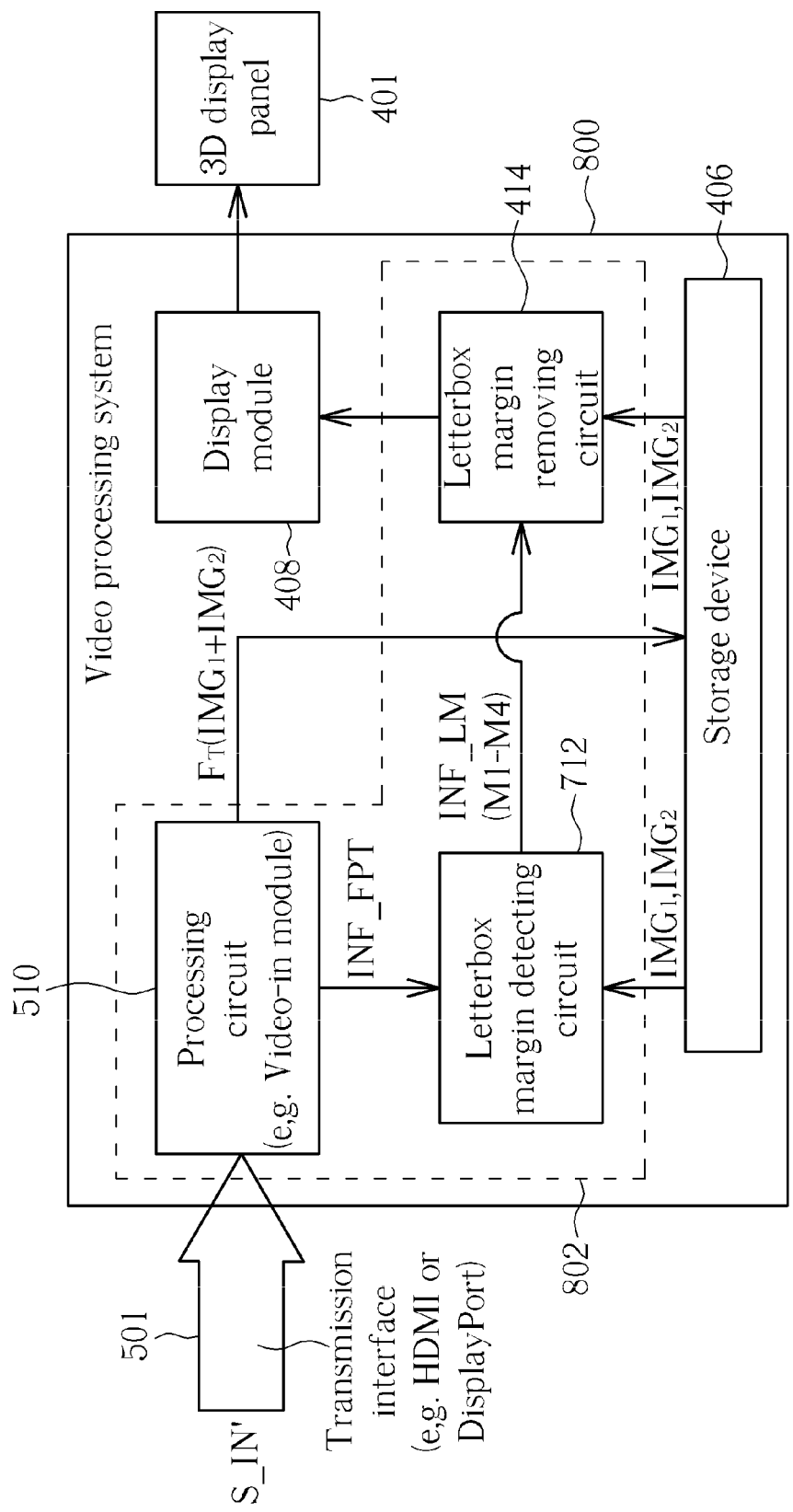
FIG. 8 is a diagram illustrating a video processing system according to a fourth exemplary embodiment of the present invention.

Please refer to FIG. 7, which is a diagram illustrating a video processing system according to a third exemplary embodiment of the present invention. The major different between the exemplary video processing systems 400 and 700 is the letterbox margin processing apparatus 702 which uses a letterbox margin detecting circuit 712 arranged to perform steps 306-308 shown in FIG. 3 as well as steps 602-604 shown in FIG. 6. Please refer to FIG. 8, which is a diagram illustrating a video processing system according to a fourth exemplary embodiment of the present invention. The major different between the exemplary video processing systems 500 and 800 is the letterbox margin processing apparatus 802 which uses the letterbox margin detecting circuit 712 arranged to perform steps 306-308 shown in FIG. 3 as well as steps 602-604 shown in FIG. 6. As a person skilled in the art can readily understand operations of other circuit components shown in FIG. 7 and FIG. 8 after reading above paragraphs, further description is omitted here for brevity.

Figure 9:
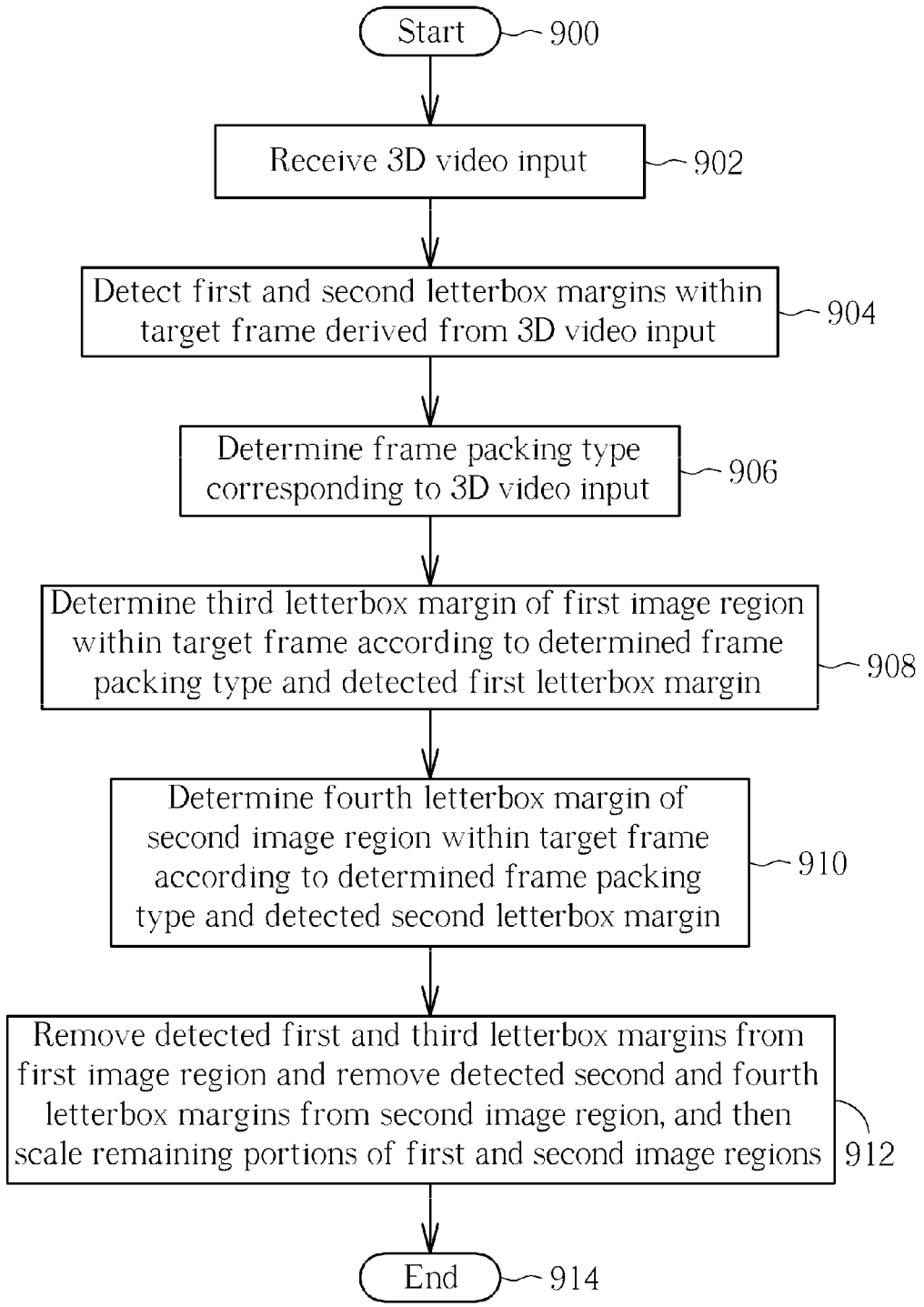
FIG. 9 is a flowchart illustrating a second exemplary letterbox margin processing method according to an embodiment of the present invention.

Please refer to FIG. 9, which is a flowchart illustrating a second exemplary letterbox margin processing method according to an embodiment of the present invention. Provided that the result is substantially the same, the steps are not required to be executed in the exact order shown in FIG. 9. The exemplary letterbox margin processing method may be briefly summarized by following steps.

Step 900: Start.

Step 902: Receive a three-dimensional (3D) video input.

Step 904: Detect a first letterbox margin and a second letterbox margin within a target frame derived from the 3D video input.

Step 906: Determine a frame packing type corresponding to the 3D video input.

Step 908: Determine a third letterbox margin of a first image region within the target frame according to the determined frame packing type and the detected first letterbox margin, wherein the determined third letterbox margin and the first letterbox margin are letterbox margins of the first image region.

Step 910: Determine a fourth letterbox margin of a second image region within the target frame according to the determined frame packing type and the detected second letterbox margin, wherein the determined fourth letterbox margin and the detected second letterbox margin are letterbox margins of the second image region.

Step 912: Remove the detected first letterbox margin and third letterbox margin from the first image region and remove the detected second letterbox margin and fourth letterbox margin from the second image region, and then scale remaining portions of the first image region and the second image region.

Step 914: End.

When the flow starts, a 3D video input is received for following video processing (steps 900 and 902). Next, step 904 is performed to identify letterbox margins within a target frame derived from the 3D video input. In a first case where the 3D video input is a 3D video bitstream which transmits encoded frames, the encoded frames will be decoded into corresponding decoded frames including the target frame to be processed for finding letterbox margins included therein. In a second case where the 3D video input, carrying decoded frames, is transmitted via a transmission interface, the target frame to be processed for finding letterbox margins included therein is directly transmitted by the 3D video input. By way of example, but not limitation, the conventional letterbox detection applicable to frames of a 2D video input may be employed to find the letterbox margins (e.g., black bars) within the target frame including a left-view frame and a right-view frame packed/combined according to a specific arrangement setting. For example, when the target frame is the frame F shown in FIG. 1, the middle non-video content area LM2 (i.e., a combination of the non-video content area $LM_{21}$ belonging to the frame F1 and the non-video content area $LM_{22}$ belonging to the frame F2) is ignored when the conventional letterbox detection is performed upon the frame F. As a result, a first letterbox margin (e.g., the left non-video content area LM1) and a second letterbox margin (e.g., the right non-video content area LM3) would be successfully identified within the target frame (i.e., the frame F). Similarly, when the target frame is the frame F' shown in FIG. 2, the middle non-video content area LM2' (i.e., a combination of the non-video content area $LM_{21}$' belonging to the frame F1' and the non-video content area $LM_{22}$' belonging to the frame F2') is ignored when the conventional letterbox detection is performed upon the frame F'. As a result, a first letterbox margin (e.g., the top non-video content area LM1') and a second letterbox margin (e.g., the bottom non-video content area LM3') would be successfully identified within the target frame (i.e., the frame F').

As shown in FIG. 9, step 906 is performed to identify a frame packing type corresponding to the 3D video input. The operation of step 906 is identical to that of step 304. Therefore, the frame packing type may be determined by using one of the above-mentioned methods. Further description is omitted here for brevity.

After the frame packing type is identified, the boundary between the left-view frame and the right-view frame horizontally/vertically combined within a target frame (e.g., a decoded frame) derived from the received 3D video input can be known. Next, steps 908 and 910 are performed to identify letterbox margins for each of the left-view frame and the right-view frame. As mentioned above, the left-view frame and the right-view frame packed/combined in the same frame have the same letterbox margin distribution characteristics. Thus, based on the boundary determined by the frame packing type and the detected first and second letterbox margins, the letterbox margins for each of the left-view frame and the right-view frame can be easily known. Taking the frame F shown in FIG. 1 for example, the boundary BR is determined when the determined frame packing type indicates that the frames F1 and F2 are horizontally arranged within the frame F. As the position and size of the non-video video area $LM_{21}$ within the frame F1 are identical to that of the detected second letterbox margin (i.e., the left non-video content area LM3), step 908 will identify a third letterbox margin (i.e., the non-video content area $LM_{21}$) within the frame F1 according to the determined frame packing type and the detected second letterbox margin. Similarly, step 910 will identify a fourth letterbox margin (i.e., the non-video content area $LM_{22}$) within the frame F2 according to the determined frame packing type and the detected first letterbox margin.

Taking the frame F' shown in FIG. 2 for example, the boundary BR' is determined when the determined frame packing type indicates that the frames F1' and F2' are vertically arranged within the frame F'. As the position and size of the non-video video area $LM_{21}$' within the frame F1' are identical to that of the detected second letterbox margin (i.e., the bottom non-video content area LM3'), step 908 will identify a third letterbox margin (i.e., the non-video content area $LM_{21}$') within the frame F1' according to the determined frame packing type and the detected second letterbox margin. Similarly, step 910 will identify a fourth letterbox margin (i.e., the non-video content area $LM_{22}$') within the frame F2' according to the determined frame packing type and the detected first letterbox margin.

In this exemplary embodiment, the first and second letterbox margins detected in step 906 and the third and fourth letterbox margins respectively determined in steps 908 and 910 may be removed to obtain margin-removed left-view and right-view frames (i.e., frames respectively including the video content areas V1 and V2 or frames respectively including the video content areas V1' and V2'), and then each of the margin-removed frames is scaled to a full screen/full resolution of a display apparatus to thereby allow the user to view the desired 3D video content without letterbox margins (step 912). However, this is for illustrative purposes only, and is not meant to be a limitation of the present invention. Any video post-processing operation based on the identified letterbox margins is feasible. For example, the letterboxed frames F1 and F2 (or F1' and F2') may be displayed with caption and/or supplemental information shown in the identified letterbox margin(s) without affecting the actual playback of the desired video content areas V1 and V2 (or V1' and V2').

Figure 10:
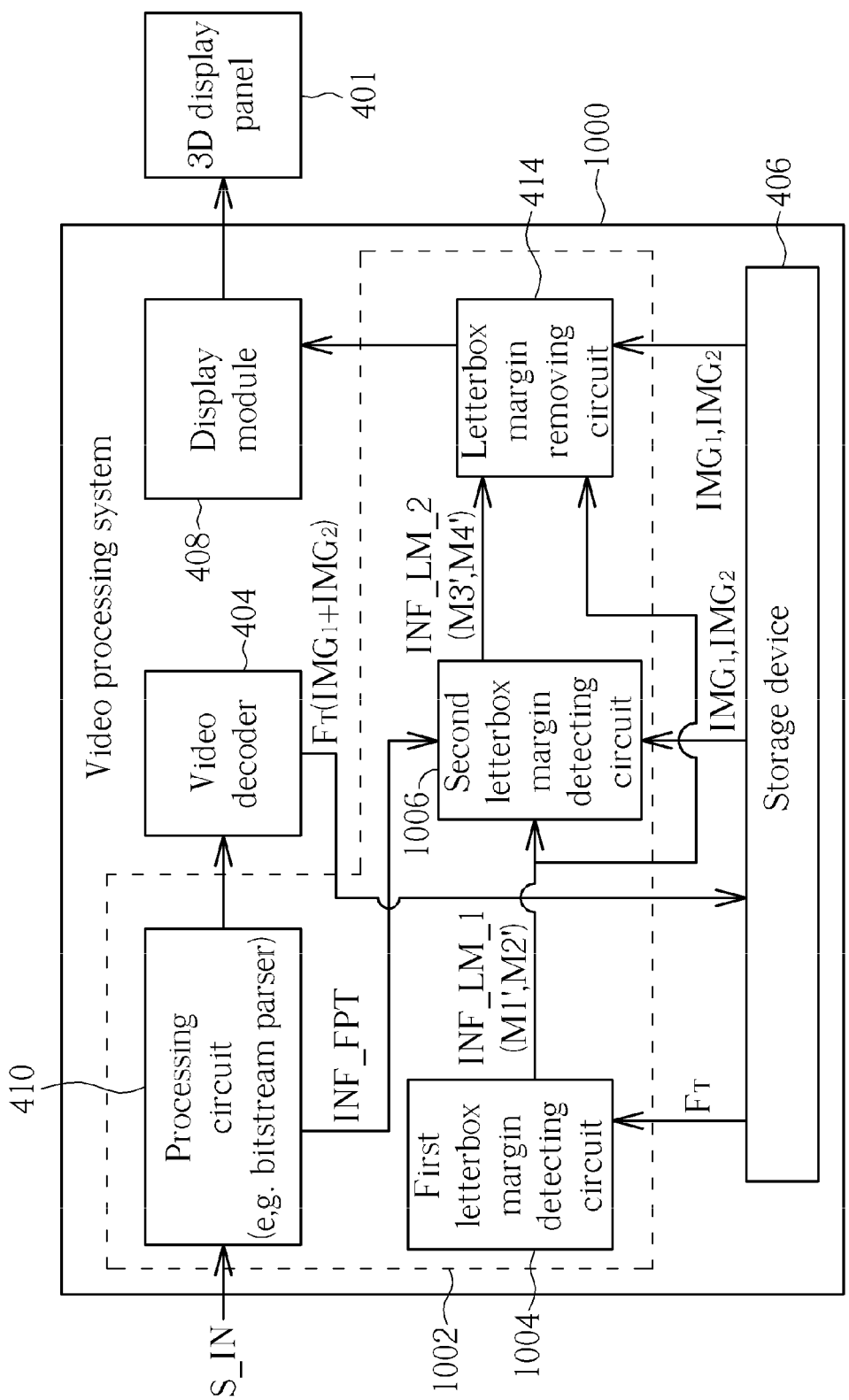
FIG. 10 is a diagram illustrating a video processing system according to a fifth exemplary embodiment of the present invention.

Please refer to FIG. 10, which is a diagram illustrating a video processing system according to a fifth exemplary embodiment of the present invention. The exemplary video processing system 1000 includes, but is not limited to, a letterbox margin processing apparatus 1002 and the aforementioned video decoder 404, storage device 406 and display module 408. The letterbox margin processing apparatus 1002 includes, but is not limited to, a first letterbox margin detecting circuit 1004, a second letterbox margin detecting circuit 1006, and the aforementioned processing circuit (e.g., a bitstream parser) 410 and letterbox margin removing circuit 414. The exemplary letterbox margin processing method shown in FIG. 9 may be employed by the letterbox margin processing apparatus 1002. The processing circuit 410 receives a 3D video input (e.g., a 3D video bitstream which transmits encoded frames) S_IN, and determines a frame packing type INF_FPT by parsing the 3D video input S_IN or checking the frame size of each decoded frame generated by the video decoder 404. By way of example, but not limitation, the 3D video input S_IN may comply with the H.264 standard, the AVS standard, or the ASF based standard. Regarding the video decoder 404, it decodes each encoded frame transmitted by the 3D video input S_IN, and accordingly generates a decoded frame to the storage device 406. For example, a target frame $F_T$ (e.g., the frame F shown in FIG. 1 or the frame F' shown in FIG. 2) is generated from the video decoder 404 and stored into the storage device 406. The first letterbox margin detecting circuit 1004 is used to detect the first letterbox margin M1' and the second letterbox margin M2' within the target frame $F_T$, for example, by using a conventional letterbox detection applicable to frames of a 2D video input. After receiving the letterbox margin information INF_LM_1 indicative of the position and size of the detected first letterbox margin M1' and second letterbox margin M2', the second letterbox margin detecting circuit 1006 determines a third letterbox margin M3' of a first image region $IMG_1$ within the target frame $F_T$ according to the determined frame packing type INF_FPT and the detected second letterbox margin M2', and determines a fourth letterbox margin M4' of a second image region $IMG_2$ within the target frame $F_T$ according to the determined frame packing type INF_FPT and the detected first letterbox margin M1', wherein the determined third letterbox margin M3' and the detected first letterbox margin M1' are letterbox margins of the first image region $IMG_1$, and the determined fourth letterbox margin M4' and the detected second letterbox margin M2' are letterbox margins of the second image region $IMG_2$. For example, the first image region $IMG_1$ may be an image region corresponding to one of the frames F1 and F2 shown in FIG. 1 and the second image region $IMG_2$ may be an image region corresponding to the other of the frames F1 and F2 shown in FIG. 1 when the frame packing type INF_FPT indicates a side-by-side arrangement; alternatively, the first image region $IMG_1$ may be an image region corresponding to one of the frames F1' and F2' shown in FIG. 2 and the second image region $IMG_2$ may be an image region corresponding to the other of the frames F1' and F2' shown in FIG. 2 when the frame packing type INF_FPT indicates a top-and-bottom arrangement.

After receiving the letterbox margin information INF_LM_1 and INF_LM_2 indicative of positions and sizes of the letterbox margins M1'-M4', the letterbox margin removing circuit 414 removes letterbox margins M1'-M4' from the first image region $IMG_1$ and the second image region $IMG_2$, and then scales remaining portions of the first image region $IMG_1$ and the second image region $IMG_2$. Next, the display module 408 drives the 3D display panel 401 according to outputs of the letterbox margin removing circuit 414.

As a person skilled in the art should readily understand operations of the circuit components shown in FIG. 10 after reading above paragraphs, further description is omitted here for brevity.

Figure 11:
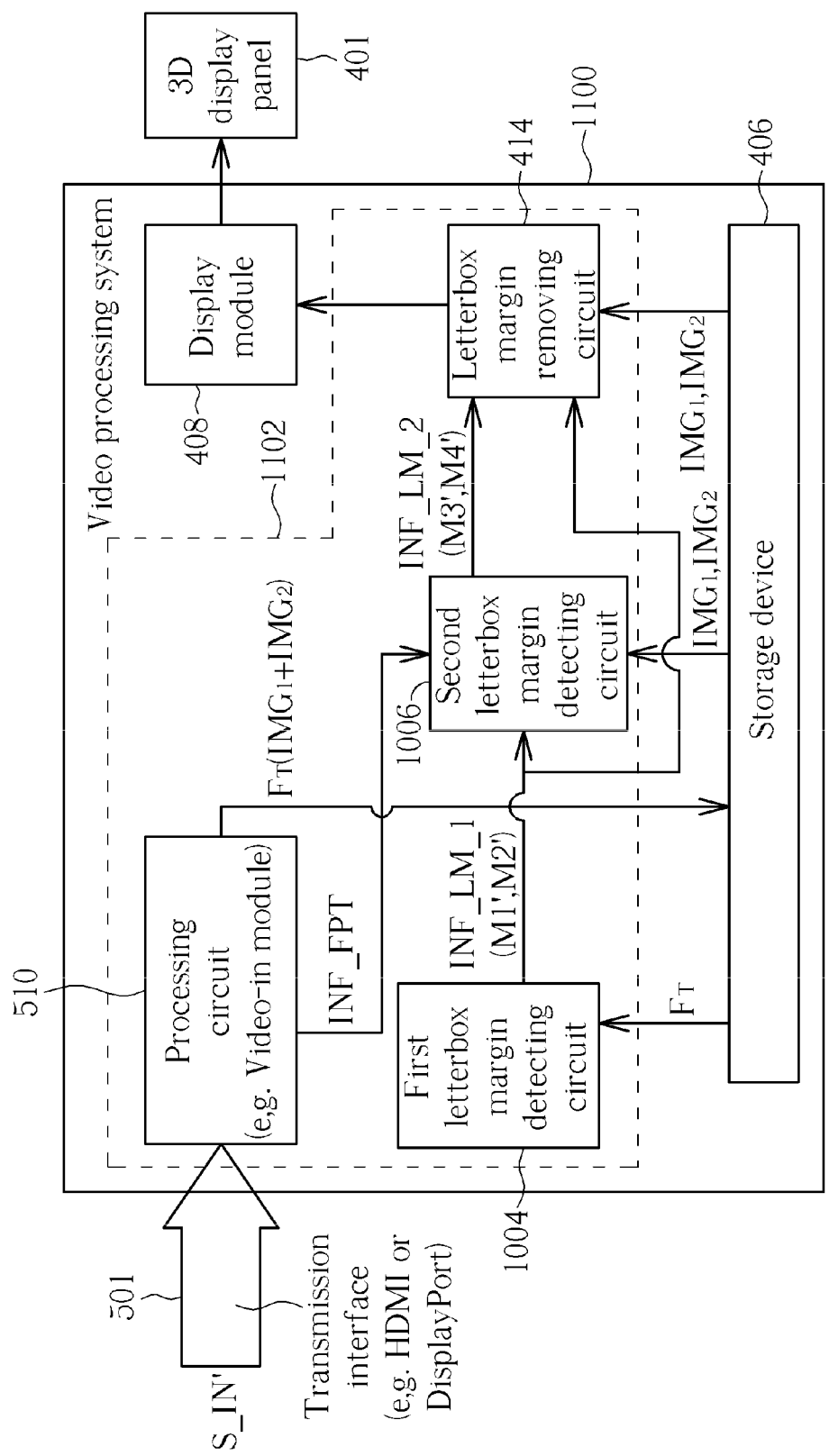
FIG. 11 is a diagram illustrating a video processing system according to a sixth exemplary embodiment of the present invention.

Please refer to FIG. 11, which is a diagram illustrating a video processing system according to a sixth exemplary embodiment of the present invention. The exemplary video processing system 110 includes, but is not limited to, a letterbox margin processing apparatus 1102 and the aforementioned storage device 406 and display module 408. The letterbox margin processing apparatus 1102 includes, but is not limited to, the aforementioned processing circuit (e.g., a video-in module) 510, first letterbox margin detecting circuit 1004, second letterbox margin detecting circuit 1006, and letterbox margin removing circuit 414. The exemplary letterbox margin processing method shown in FIG. 9 may be employed by the letterbox margin processing apparatus 1102. The major difference between the letterbox margin processing apparatuses 1102 and 1002 is the processing circuit 510 which may determine the frame packing type INF_FPT by receiving a system indication (e.g., an HDMI 3D_Structure field or a DisplayPort stereo interface method code) specified by the transmission interface (e.g., an HDMI interface or a DisplayPort interface) 501 or checking the frame size of each decoded frame transmitted by the 3D video input S_IN'. For example, the 3D video input S_IN' may carry decoded frames generated by a preceding stage (e.g., a video decoder implemented in an optical disc player).

As a person skilled in the art should readily understand operations of the circuit components shown in FIG. 11 after reading above paragraphs, further description is omitted here for brevity.

Figure 12:
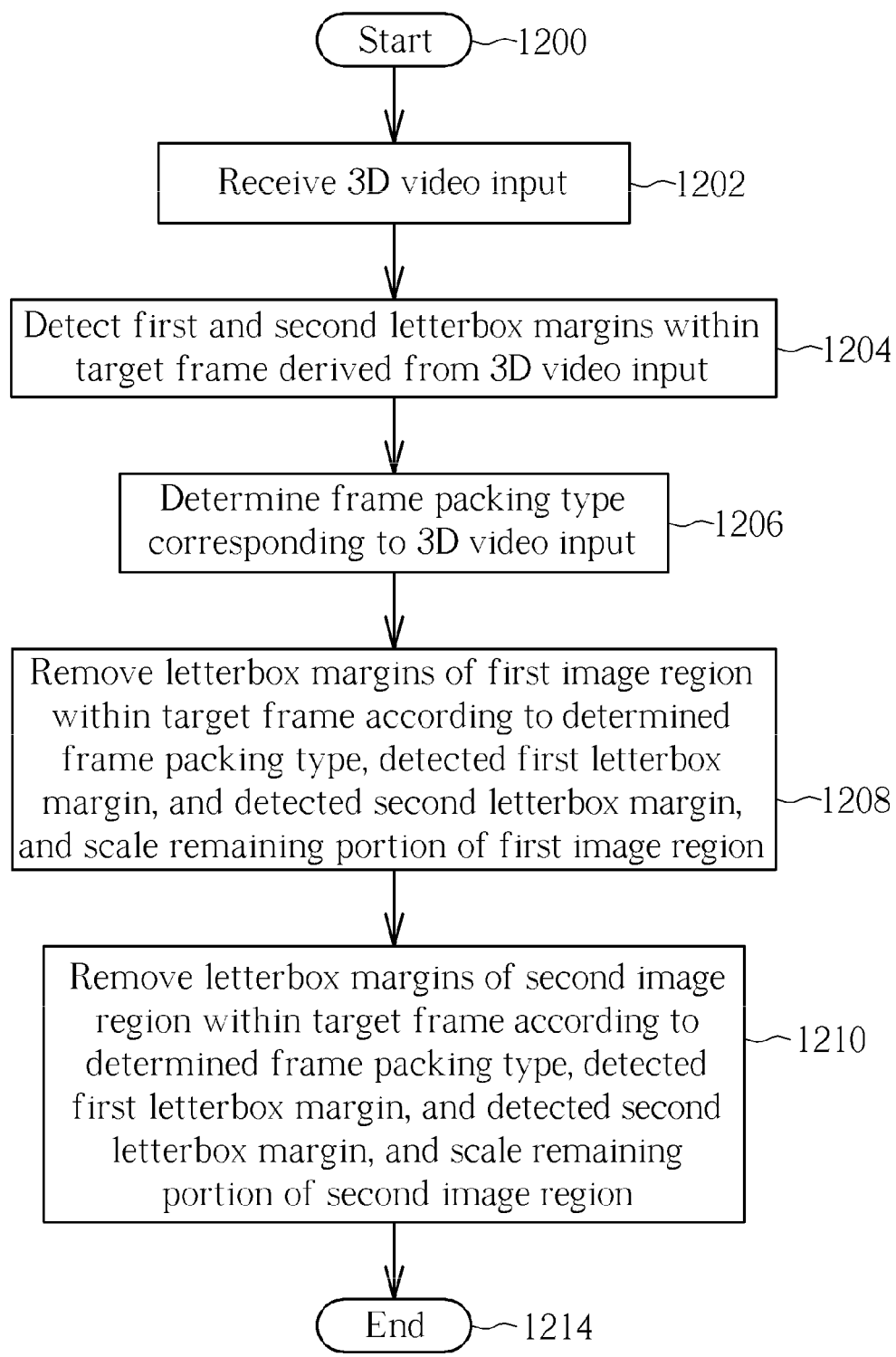
FIG. 12 is a flowchart illustrating a third exemplary letterbox margin processing method according to an embodiment of the present invention.

Please refer to FIG. 12, which is a flowchart illustrating a third exemplary letterbox margin processing method according to an embodiment of the present invention. Provided that the result is substantially the same, the steps are not required to be executed in the exact order shown in FIG. 12. The exemplary letterbox margin processing method may be briefly summarized by following steps.

Step 1200: Start.

Step 1202: Receive a three-dimensional (3D) video input.

Step 1204: Detect a first letterbox margin and a second letterbox margin within a target frame derived from the 3D video input.

Step 1206: Determine a frame packing type corresponding to the 3D video input.

Step 1208: Remove letterbox margins of a first image region within the target frame according to the determined frame packing type, the detected first letterbox margin, and the detected second letterbox margin, and scale a remaining portion of the first image region, wherein the letterbox margins of the first image region include the detected first letterbox margin.

Step 1210: Remove letterbox margins of a second image region within the target frame according to the determined frame packing type, the detected first letterbox margin, and the detected second letterbox margin, and scale a remaining portion of the second image region, wherein the letterbox margins of the second image region include the detected second letterbox margin.

Step 1212: End.

The operations of steps 1202-1206 are identical to that of steps 902-906. Further description is therefore omitted here for brevity. The major difference between the exemplary letterbox margin processing methods shown in FIG. 9 and FIG. 12 is that each of the steps 1208 and 1210 in FIG. 12 has the letterbox margin detection integrated within the letterbox margin removing operation. Specifically, the third letterbox margin is found and removed during the letterbox margin removing operation performed upon the first image region $IMG_1$, and the fourth letterbox margin is found and removed during the letterbox margin removing operation performed upon the second image region $IMG_2$.

Figure 13:
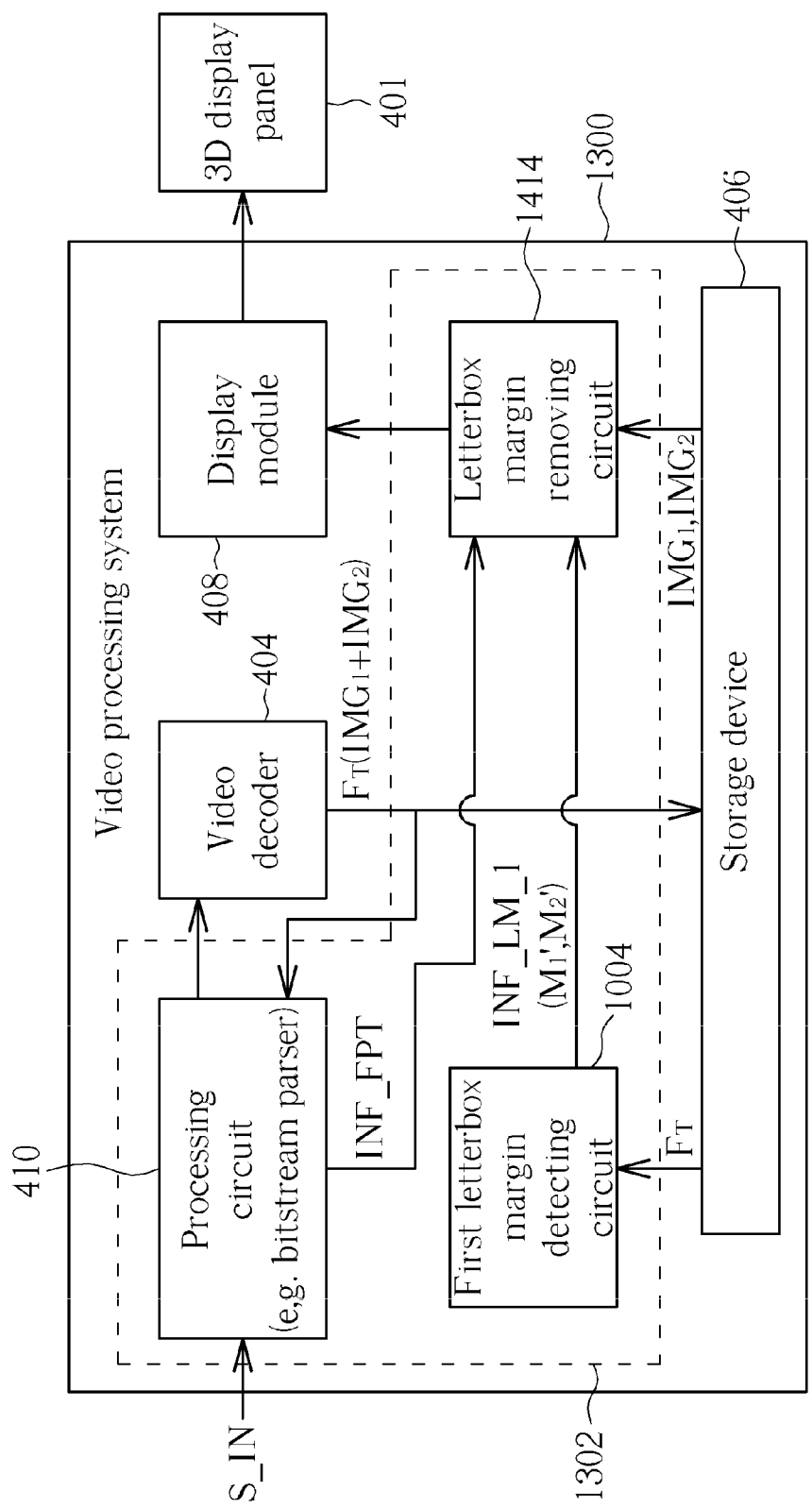
FIG. 13 is a diagram illustrating a video processing system according to a seventh exemplary embodiment of the present invention.

Please refer to FIG. 13, which is a diagram illustrating a video processing system according to a seventh exemplary embodiment of the present invention. The exemplary video processing system 1300 includes, but is not limited to, a letterbox margin processing apparatus 1302 and the aforementioned video decoder 404, storage device 406 and display module 408. The letterbox margin processing apparatus 1302 includes, but is not limited to, a letterbox margin detecting circuit (e.g., the aforementioned first letterbox margin detecting circuit 1004), the aforementioned processing circuit (e.g., a bitstream parser) 410, and a letterbox margin removing circuit 1414. The exemplary letterbox margin processing method shown in FIG. 12 may be employed by the letterbox margin processing apparatus 1302. The processing circuit 410 receives a 3D video input (e.g., a 3D video bitstream which transmits encoded frames) S_IN, and determines a frame packing type INF_FPT by parsing the 3D video input S_IN or checking the frame size of each decoded frame generated by the video decoder 404. By way of example, but not limitation, the 3D video input S_IN may comply with the H.264 standard, the AVS standard, or the ASF based standard. Regarding the video decoder 404, it decodes each encoded frame transmitted by the 3D video input S_IN, and accordingly generates a corresponding decoded frame to the storage device 406. For example, a target frame $F_T$ (e.g., the frame F shown in FIG. 1 or the frame F' shown in FIG. 2) is generated from the video decoder 404 and stored into the storage device 406. As mentioned above, the first letterbox margin detecting circuit 1004 is used to detect the first letterbox margin M1' and the second letterbox margin M2' within the target frame $F_T$, for example, by using a conventional letterbox detection applicable to frames of a 2D video input. After receiving the frame packing type INF_FPT and the letterbox margin information INF_LM_1 indicative of the position and size of the detected first letterbox margin M1' and second letterbox margin M2', the letterbox margin removing circuit 1414 removes letterbox margins from the first image region $IMG_1$ according to the determined frame packing type INF_FPT and the detected first and second letterbox margins M1' and M2', and also removes letterbox margins from the second image region $IMG_1$ according to the determined frame packing type INF_FPT and the detected first and second letterbox margins M1' and M2', wherein letterbox margins of the first image region $IMG_1$ includes the detected first letterbox margin M1', and letterbox margins of the second image region $IMG_2$ includes the detected second letterbox margin M2'. For example, the first image region $IMG_1$ may be an image region corresponding to one of the frames F1 and F2 shown in FIG. 1, the second image region $IMG_2$ may be an image region corresponding to the other of the frames F1 and F2 shown in FIG. 1, and the detected first and second letterbox margins M1' and M2' may be non-video content area LM1 and LM3 shown in FIG. 1 when the frame packing type INF_FPT indicates a side-by-side arrangement; alternatively, the first image region $IMG_1$ may be an image region corresponding to one of the frames F1' and F2' shown in FIG. 2, the second image region $IMG_2$ may be an image region corresponding to the other of the frames F1' and F2' shown in FIG. 2, and the detected first and second letterbox margins M1' and M2' may be non-video content areas LM1' and LM3' shown in FIG. 2 when the frame packing type INF_FPT indicates a top-and-bottom arrangement. Moreover, the letterbox margin removing circuit 1414 may scale remaining portions of the first image region $IMG_1$ and the second image region $IMG_2$. Next, the display module 408 drives the 3D display panel 401 according to outputs of the letterbox margin removing circuit 1414.

As a person skilled in the art should readily understand operations of the circuit components shown in FIG. 13 after reading above paragraphs, further description is omitted here for brevity.

Figure 14:
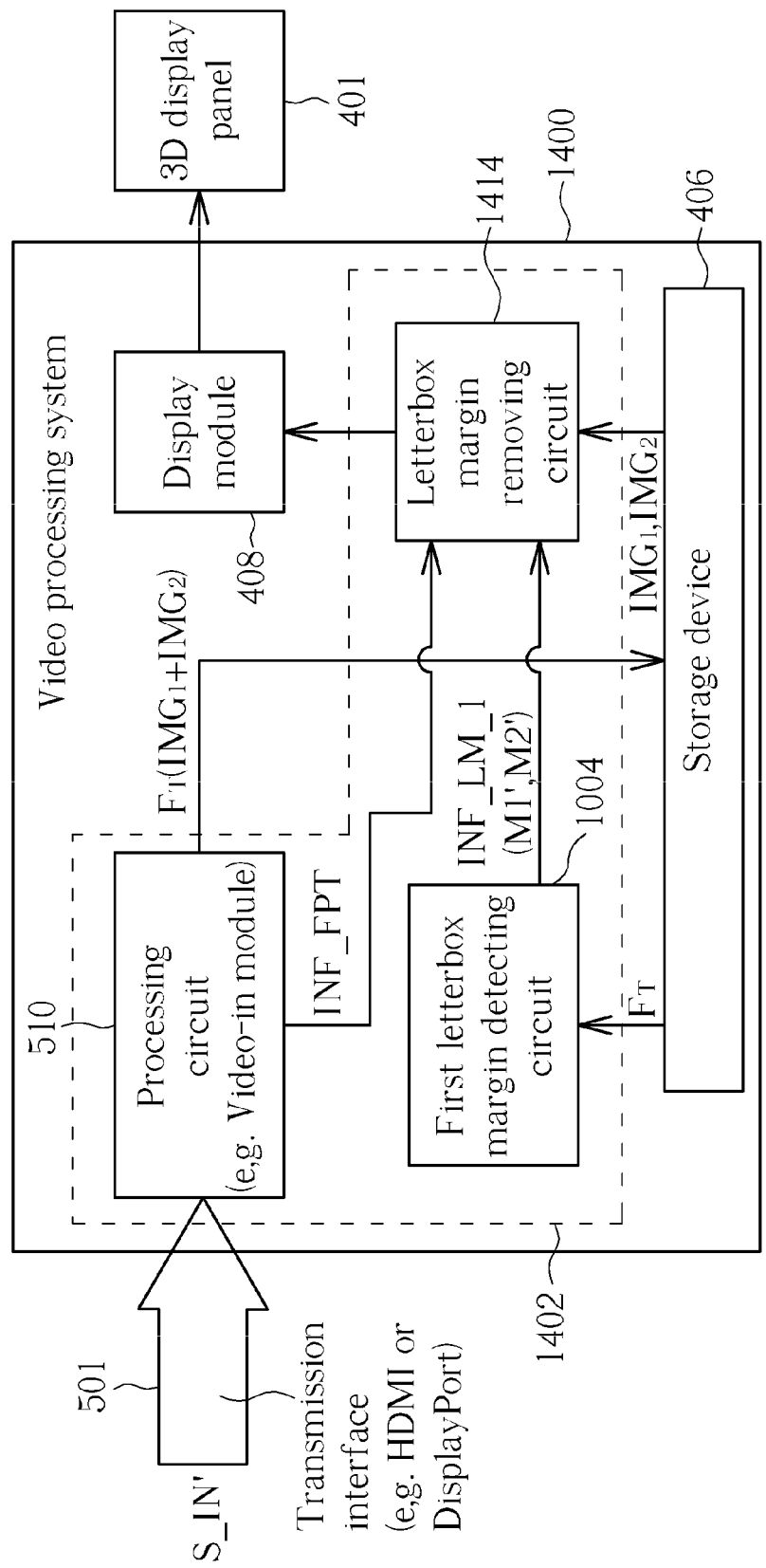
FIG. 14 is a diagram illustrating a video processing system according to an eighth exemplary embodiment of the present invention.

Please refer to FIG. 14, which is a diagram illustrating a video processing system according to an eighth exemplary embodiment of the present invention. The exemplary video processing system 1400 includes, but is not limited to, a letterbox margin processing apparatus 1402 and the aforementioned storage device 406 and display module 408. The letterbox margin processing apparatus 1402 includes, but is not limited to, the aforementioned processing circuit (e.g., a video-in module) 510, a letterbox margin detecting circuit (e.g., the aforementioned first letterbox margin detecting circuit 1004), and the aforementioned letterbox margin removing circuit 1414. The exemplary letterbox margin processing method shown in FIG. 12 may be employed by the letterbox margin processing apparatus 1402. The major difference between the letterbox margin processing apparatuses 1402 and 1302 is the processing circuit 510 which may determine the frame packing type INF_FPT by receiving a system indication (e.g., an HDMI 3D_Structure field or a DisplayPort stereo interface method code) specified by the transmission interface (e.g., an HDMI interface or a DisplayPort interface) 501 or checking the frame size of each decoded frame transmitted by the 3D video input S_IN'. For example, the 3D video input S_IN' may carry decoded frames generated by a preceding stage (e.g., a video decoder implemented in an optical disc player).

As a person skilled in the art should readily understand operations of the circuit components shown in FIG. 14 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A letterbox margin processing method, comprising:
receiving a three-dimensional (3D) video input;
determining a frame packing type corresponding to the 3D video input, wherein the frame packing type is indicative of an arrangement of a plurality of image regions with different views that are packed in a same frame;
selecting a first image region from a target frame according to the determined frame packing type, wherein the target frame is derived from the 3D video input; and
detecting letterbox margins within the first image region.

2. The letterbox margin processing method of claim 1, wherein the 3D video input is a 3D video bitstream transmitting encoded frames, and determining the frame packing type corresponding to the 3D video input comprises: parsing the 3D video bitstream and accordingly obtaining the frame packing type.

3. The letterbox margin processing method of claim 2, wherein the 3D video bitstream complies with an H.264 standard, an audio and video coding standard (AVS), or an advanced streaming format (ASF) based standard.

4. The letterbox margin processing method of claim 1, wherein the 3D video input is transmitted via a transmission interface, and determining the frame packing type corresponding to the 3D video input comprises:
receiving a system indication specified by the transmission interface; and
obtaining the frame packing type according to the system indication.

5. The letterbox margin processing method of claim 4, wherein the transmission interface is a high-definition multimedia interface (HDMI) or a DisplayPort interface.

6. The letterbox margin processing method of claim 1, wherein determining the frame packing type corresponding to the 3D video input comprises:
determining the frame packing type according to a frame size of each frame derived from the 3D video input.

7. The letterbox margin processing method of claim 1, further comprising:
determining letterbox margins within a second image region of the target frame according to the detected letterbox margins within the first image region.

8. The letterbox margin processing method of claim 7, wherein the first image region and the second image region are horizontally or vertically arranged within the target frame.

9. The letterbox margin processing method of claim 1, further comprising:
   selecting a second image region from the target frame according to the determined frame packing type; and
   detecting letterbox margins within the second image region.

10. The letterbox margin processing method of claim 9, wherein the first image region and the second image region are horizontally or vertically arranged within the target frame.

11. A letterbox margin processing method, comprising:
   receiving a three-dimensional (3D) video input;
   detecting a first letterbox margin and a second letterbox margin within a target frame derived from the 3D video input;
   determining a frame packing type corresponding to the 3D video input, wherein the frame packing type is indicative of an arrangement of a plurality of image regions with different views that are packed in a same frame;
   determining a third letterbox margin of a first image region within the target frame according to the determined frame packing type and the detected second letterbox margin, wherein the determined third letterbox margin and the detected first letterbox margin are letterbox margins of the first image region; and
   determining a fourth letterbox margin of a second image region within the target frame according to the determined frame packing type and the detected first letterbox margin, wherein the determined fourth letterbox margin and the detected second letterbox margin are letterbox margins of the second image region.

12. The letterbox margin processing method of claim 11, wherein the 3D video input is a 3D video bitstream transmitting encoded frames, and determining the frame packing type corresponding to the 3D video input comprises: parsing the 3D video bitstream and accordingly obtaining the frame packing type.

13. The letterbox margin processing method of claim 12, wherein the 3D video bitstream complies with an H.264 standard, an audio and video coding standard (AVS), or an advanced streaming format (ASF) based standard.

14. The letterbox margin processing method of claim 11, wherein the 3D video input is transmitted via a transmission interface, and determining the frame packing type corresponding to the 3D video input comprises:
   receiving a system indication specified by the transmission interface; and
   obtaining the frame packing type according to the system indication.

15. The letterbox margin processing method of claim 14, wherein the transmission interface is a high-definition multimedia interface (HDMI) or a DisplayPort interface.

16. The letterbox margin processing method of claim 11, wherein
   determining the frame packing type corresponding to the 3D video input comprises:
   determining the frame packing type according to a frame size of each frame derived from the 3D video input.

17. The letterbox margin processing method of claim 11, wherein the first image region and the second image region are horizontally or vertically arranged within the target frame.

18. A letterbox margin processing method, comprising:
   receiving a three-dimensional (3D) video input;
   detecting a first letterbox margin and a second letterbox margin within a target frame derived from the 3D video input;
   determining a frame packing type corresponding to the 3D video input, wherein the frame packing type is indicative of an arrangement of a plurality of image regions with different views that are packed in a same frame;
   removing letterbox margins of a first image region within the target frame according to the determined frame packing type, the detected first letterbox margin, and the detected second letterbox margin, wherein the letterbox margins of the first image region include the detected first letterbox margin; and
   removing letterbox margins of a second image region within the target frame according to the determined frame packing type, the detected first letterbox margin, and the detected second letterbox margin, wherein the letterbox margins of the second image region include the detected second letterbox margin.

19. The letterbox margin processing method of claim 18, wherein the 3D video input is a 3D video bitstream transmitting encoded frames, and determining the frame packing type corresponding to the 3D video input comprises: parsing the 3D video bitstream and accordingly obtaining the frame packing type.

20. The letterbox margin processing method of claim 19, wherein the 3D video bitstream complies with an H.264 standard, an audio and video coding standard (AVS), or an advanced streaming format (ASF) based standard.

21. The letterbox margin processing method of claim 18, wherein the 3D video input is transmitted via a transmission interface, and determining the frame packing type corresponding to the 3D video input comprises:
   receiving a system indication specified by the transmission interface; and
   obtaining the frame packing type according to the system indication.

22. The letterbox margin processing method of claim 21, wherein the transmission interface is a high-definition multimedia interface (HDMI) or a DisplayPort interface.

23. The letterbox margin processing method of claim 18, wherein
   determining the frame packing type corresponding to the 3D video input comprises:
   determining the frame packing type according to a frame size of each frame derived from the 3D video input.

24. The letterbox margin processing method of claim 18, wherein the first image region and the second image region are horizontally or vertically arranged within the target frame.

25. A letterbox margin processing apparatus, comprising:
   a processing circuit, arranged to receive a three-dimensional (3D) video input, and determine a frame packing type corresponding to the 3D video input, wherein the frame packing type is indicative of an arrangement of a plurality of image regions with different views that are packed in a same frame; and
   a letterbox margin detecting circuit, coupled to the processing circuit, for selecting a first image region from a target frame according to the determined frame packing type, and detecting letterbox margins within the first image region, wherein the target frame is derived from the 3D video input.

26. A letterbox margin processing apparatus, comprising:
   a processing circuit, arranged to receive a three-dimensional (3D) video input and determine a frame packing type corresponding to the 3D video input, wherein the frame packing type is indicative of an arrangement of a plurality of image regions with different views that are packed in a same frame;

a first letterbox margin detecting circuit, coupled to the processing circuit, for detecting a first letterbox margin and a second letterbox margin within a target frame derived from the 3D video input; and a second letterbox margin detecting circuit, coupled to the processing circuit and the first letterbox margin detecting circuit, for determining a third letterbox margin of a first image region within the target frame according to the determined frame packing type and the detected second letterbox margin, and determining a fourth letterbox margin of a second image region within the target frame according to the determined frame packing type and the detected first letterbox margin, wherein the determined third letterbox margin and the detected first letterbox margin are letterbox margins of the first image region, and the determined fourth letterbox margin and the detected second letterbox margin are letterbox margins of the second image region.

27. A letterbox margin processing apparatus, comprising:

a processing circuit, arranged to receive a three-dimensional (3D) video input and determine a frame packing type corresponding to the 3D video input, wherein the frame packing type is indicative of an arrangement of a plurality of image regions with different views that are packed in a same frame;

a letterbox margin detecting circuit, coupled to the processing circuit, for detecting a first letterbox margin and a second letterbox margin within a target frame derived from the 3D video input; and a letterbox margin removing circuit, coupled to the processing circuit and the letterbox margin detecting circuit, for removing letterbox margins of a first image region within the target frame according to the determined frame packing type, the detected first letterbox margin, and the detected second letterbox margin, and removing letterbox margins of a second image region within the target frame according to the determined frame packing type, the detected first letterbox margin, and the detected second letterbox margin, wherein the letterbox margins of the first image region include the detected first letterbox margin, and the letterbox margins of the second image region include the detected second letterbox margin.

28. The letterbox margin processing method of claim 11, wherein the first letterbox margin and the second letter box margin are located on opposite sides of the target frame.

29. The letterbox margin processing apparatus of claim 26, wherein the first letterbox margin and the second letter box margin are located on opposite sides of the target frame.

30. The letterbox margin processing method of claim 18, wherein the letterbox margins of the first image region do not include the detected second letterbox margin in the target frame, and the letterbox margins of the second image region do not include the detected first letterbox margin in the target frame.

31. The letterbox margin processing apparatus of claim 27, wherein the letterbox margins of the first image region do not include the detected second letterbox margin in the target frame, and the letterbox margins of the second image region do not include the detected first letterbox margin in the target frame.

* * * * *